United States Patent Office 3,044,867
Patented July 17, 1962

3,044,867
METHOD FOR THE PRODUCTION OF METALLIC-CERAMIC MATERIALS
John Olof Edström, Enskede, Sweden, assignor to Messrs. Aktiebolaget Svenska Metallverken, Vasteras, Sweden
No Drawing. Filed June 4, 1957, Ser. No. 663,366
Claims priority, application Sweden May 15, 1957
2 Claims. (Cl. 75—.5)

The present invention relates to a new process for the production of metallic-ceramic materials.

Due to the progress in the field of high temperature techniques, increasing demands have been made on materials which are to be subjected to high temperatures. In order to solve problems in which high temperatures are involved, it has been suggested to use so-called metallic-ceramic materials (cermets) which may be mixtures of oxides and metals. It, however, should be noted that the oxidic component or the ceramic component, which latter is responsible for the temperature resistance of the material, is to be present in an amount that exceeds the contents of impurities in usual metal powders. This means usually that the percentage is to be above about 1%, preferably above about 2%, and in a number of cases above about 5%.

In materials having a lower content of oxidic components such as, for example, materials which may be obtained by dry reduction of iron oxide materials without any more essential amount of non-reducible components, the contents of oxidic or ceramic material do not add anything essential to the temperature resistance properties of the materials. It is only at higher contents of such ceramic components that the high-temperature properties discussed above will be realized.

Different methods for the production of said materials are known. Thus, it is known to mix powders of an oxide or, in other words, to form the ceramic component and powders of a metallic component and then press and sinter the mixture to form an article which will then resist higher temperatures. Furthermore, it is known to produce shaped articles or products comprising alumina as the ceramic component and aluminum as the metallic component by pressing and sintering aluminum powder which is oxidized on the surface of its particles. However, none of these methods to produce the aforesaid materials are particularly successful. Moreover, the method described for the production of aluminum-alumina-containing articles is not easy to apply to other metals and has thus a disadvantage in this respect. If the production of articles is effected according to the former method, there are always difficulties involved in obtaining a good adherence and wetting between the metallic and oxidic components. This deleteriously influences the strength properties of the resulting product.

In the present invention these disadvantages are removed and the purpose is to provide a solution of the problem of how to produce metallic-ceramic materials which show improved strength properties, whether they are produced directly in the form of finished articles or if they are converted into shaped articles from a semifinished product.

An object of the present invention is to produce an improved method for the production of metallic-ceramic material. According to the invention there is at first produced a chemical compound or a solid solution consisting on the one hand of oxides capable of being relatively easily reduced to metal such as, for example, oxides of Fe, Ni, Co, Mo, W, Au, Ag, Cu, Pb, Sn, and so on and, on the other hand, of oxides capable of being reduced with relative difficulty to metal such as, for example, oxides of Zn, Cr, Mn, Si, V, Ti, Ba, Al, Zr, Mg, Ca, and so on. This chemical compound or solid solution is then subjected to a reduction treatment at such a temperature that the chemical compound as well as the reduction products formed therefrom are in solid condition and under such conditions that only the easily reducible oxide components are reduced. Then a particularly intimate mixture of metal and oxide having complete wetting between the phases is obtained, and the oxidic components may be so finely dispersed that they are only observable with difficulty in an optical microscope.

Oxides can take an intermediate position in the respect of reducibility. Under less active reduction conditions they may serve as non-reducible oxide components, and in more active reduction conditions they may serve as reducible oxide components. As an example of chemical compounds contemplated here there may be selected minerals from the spinel group. The composition of these minerals is usually summarized by the formula $RO.Q_2O_3$, in which $R=Mg$, $Fe^{II}$, Zn, Mn, and $Q=Al$, $Fe^{III}$, and Cr. If, for example, $Al_2FeO_4$ is reduced in solid phase, an intimate mixture of $Al_2O_3$ and Fe is obtained. In a corresponding way $Al_2NiO_4$, $Al_2CoO_4$ and so on can be obtained. Compounds composed in similar manner, such as ferrites, wolframates and so on, are also useful for partial reduction in solid phase to metallic-ceramic materials.

In many oxide combinations the ratio of the reducible oxide and the non-reducible oxide may be varied considerably. For example in the system $CaO$—$Fe_2O_3$ the phases $Ca_2Fe_2O_5$, $CaFe_2O_4$ and $CaFe_4O_7$ are present, all being partially reducible to $CaO+Fe$-metal. Furthermore the components often show varying solubility in the phases. By balancing the ratio of amounts between the oxide components of the chemical compound and the solid solution, from which the metallic-ceramic material is to be produced, a desired ratio of amounts between metal and oxide in this material may be easily adjusted. Of course, it is not necessary for the chemical compound to contain only two oxide components. Instead, the number of components may be varied to obtain desirable properties of the metallic-ceramic material. Thus, the base metal may, for example, be alloyed by having a number of reducible oxides present in the starting material, and also the composition of the ceramic component of the metallic-ceramic material may be varied.

As a staring material for the production of the chemical compound or solid solution of oxygen compounds, particularly of oxides, either powders of pure oxides or also minerals, for example, comprising mixed oxides, such as spinels, inclusive of chromite and titanomagnetite and so on, may serve.

The chemical compound or solid solution may be produced by sintering together or chemical reaction between the finely dispersed oxide components, in which in view of expediting the reaction, the oxide components ought to be pressed together prior to sintering and reaction. The chemical compound or solid oxide solution may also be prepared by melting together the oxide components. The oxide mixture to be heat treated may further be prepared by calcination of salts such as carbonates and sulfates, or hydroxides, or by roasting of sulfides. Prior to the reduction according to the invention the material may comprise:

(1) A chemical compound or solid solution composed of oxygen compounds, particularly of oxides;

(2) More than one chemical compound or solid solutions composed of oxygen compounds, particularly of oxides;

(3) One or more chemical compounds or solid solutions composed of oxygen compounds, particularly of oxides, as well as a surplus of reducible oxide components;

(4) One or more chemical compounds or solid solutions composed of oxygen compounds, particularly of oxides, as well as a surplus of non-reducible oxide components.

The reduction may occur with gaseous as well as solid reducing agents according to processes known to those skilled in the art.

Articles of the metallic-ceramic material may be prepared by pressing and sintering powders comprising the partially reduced oxide compound. The non-reduced oxide compound or solid solution may also be fused and cast or may be pressed and sintered in the form of powder to articles of desired shape, which are then partially reduced according to the invention to oxide and metal. The density of the metallic-ceramic material may be increased by a subsequent cold or hot working.

The following examples are in accordance with the invention:

Example 1

A mixture of 5% CaO and 95% $Fe_2O_3$ in the form of powder was pressed to briquettes having the diameter 20 mms. and thickness of 5 mms. The briquettes were treated in an oxygen atmosphere at 1200° C. for 24 hours. On investigation of the resulting briquettes they appeared to be composed of about 60% $Fe_2O_3$ and about 40% of the phase $CaO.2Fe_2O_3$. The briquettes were reduced at 1000° C. for 5 hours in an atmosphere of pure CO. The reduced briquettes showed small porosity and under a microscope with an enlargement of up to 2000 times they appeared to comprise only one metallic phase. On X-ray investigation, however, it appeared that the reduced briquettes comprised the phases Fe and CaO. Thus, the CaO-phase is so finely dispersed in the metal phase that it cannot be discovered in an optical microscope.

Example 2

90% $Fe_2O_3$ and 10% $Al_2O_3$ were briquetted according to the aforesaid and treated in air at 1230° C. for 50 hours. The briquettes then comprised an oxide compound, namely a solid solution of $Al_2O_3$ in $Fe_2O_3$. The briquettes were then reduced by CO at 1000° C. for 2 hours. A microscopical investigation of the reduced briquettes showed that oxide precipitations having a maximum diameter of $1\mu$ were present in a metallic base mass. X-ray investigation showed that the phases Fe and $Al_2O_3$ were present.

Example 3

Briquettes of 20% $Cr_2O_3$ and 80% $Fe_2O_3$ were produced from powders according to Example 1 and treated in an oxidizing atmosphere according to Example 2, and a one-phase product was obtained. This was reduced and investigated according to Example 2. It appeared that the reduction product had a structure as in Example 2, but comprised the phases $Cr_2O_3$ and Fe.

Example 4

4% $Al_2O_3$ and 96% $Cu_2O$ were mixed in the form of powder and treated in air at 1150° C. for 48 hours. The reaction product thus obtained was then reduced for 4 hours in a stream of hydrogen gas at 500° C.

The reduced product was then ground in a mortar to a powder having a particle size of less than 0.15 mm.

The powder was pressed into test bars with a pressure of 4 tons per $cm.^2$. The bars were then sintered in hydrogen gas at 900° C. for 45 minutes.

Tests for tensile strength were carried out on the test bars thus produced. A yield ratio of 12 kgs. per $mm.^2$ was obtained and the elongation was 32%.

Having now particularly described and ascertained the nature of my said invention and in which manner the same is to be performed, I declare that what I claim is:

1. A method for the production of metallic-ceramic materials which comprises the steps of subjecting to a heat-treatment in air a mixture comprising two oxide components adapted to form each other a solid oxide solution, one of said oxide components being selected from the group consisting of oxides of the metallic elements iron, nickel, cobalt, molybdenum, tungsten, gold, silver, copper, lead and tin, and the other oxide component being selected from the group consisting of oxides of the metallic elements zinc, chromium, manganese, silicon, vanadium, titanium, barium, aluminum, zirconium, magnesium and calcium, said other oxide component being more difficult to reduce than said one oxide component, effecting the heat-treatment at a temperature of at least 1150° C. and during a period of time sufficient to form said solid oxide solution, and then subjecting the thus-formed solid oxide solution to a reduction in solid state so that only said one oxide is at least partly reduced to a metallic matrix and said other oxide remains in a highly dispersed state in said metallic matrix.

2. A method for the production of metallic-ceramic materials which comprises the steps of subjecting to a heat-treatment in air a mixture comprising two oxide components adapted to form with each other a compound, one of said oxide components being selected from the group consisting of oxides of the metallic elements iron, nickel, cobalt, molybdenum, tungsten, gold, silver, copper, lead and tin, and the other of said oxide components being selected from the group consisting of oxides of the metallic elements, zinc, chromium, manganese, silicon, vanadium, titanium, barium, aluminum, zirconium, magnesium and calcium, said other oxide component being more difficult to reduce than said one oxide component, effecting the heat-treatment at a temperature of at least 1150° C. and during a period of time sufficient to form said compound, and then subjecting the thus-formed compound to a reduction in solid state so that only said one oxide is at least partly reduced to a metallic matrix and said other oxide remains in a highly dispersed state in said metallic matrix.

References Cited in the file of this patent

UNITED STATES PATENTS

| Number | Name | Date |
|---|---|---|
| 1,003,693 | Beshore | Sept. 19, 1911 |
| 2,315,302 | Volterra | Mar. 30, 1943 |
| 2,328,410 | Berge | Aug. 31, 1943 |
| 2,406,172 | Smithells | Aug. 20, 1946 |
| 2,492,543 | Verwey | Dec. 27, 1949 |
| 2,541,140 | Woodcock et al. | Feb. 13, 1951 |
| 2,616,859 | Verwey | Nov. 4, 1952 |
| 2,747,260 | Carlton et al. | May 29, 1956 |
| 2,823,988 | Grant et al. | Feb. 15, 1958 |
| 2,893,859 | Triffleman | July 7, 1959 |